United States Patent [19]

Gotoh et al.

[11] Patent Number: 5,409,744
[45] Date of Patent: Apr. 25, 1995

[54] POLYMER DISPERSED LIQUID CRYSTAL OPTICAL DEVICES

[75] Inventors: Tomohisa Gotoh; Hideya Murai; Taisaku Nakata, all of Tokyo, Japan

[73] Assignee: NEC Corporation, Japan

[21] Appl. No.: 122,378

[22] Filed: Sep. 16, 1993

[30] Foreign Application Priority Data

Sep. 28, 1992 [JP] Japan .................... 4-257887

[51] Int. Cl.$^6$ ........................................ G02F 1/13
[52] U.S. Cl. ........................... 428/1; 359/52; 252/299.5
[58] Field of Search ............. 428/1; 359/52; 252/299.05, 299.01

Primary Examiner—Alexander S. Thomas
Attorney, Agent, or Firm—Laff, Whitesel, Conte & Saret, Ltd.

[57] ABSTRACT

A polymer dispersed liquid crystal optical device has two substrate each having an electrode layer. At least one of the substrates is transparent. An ultraviolet-cured product, such as a polymer material and a liquid crystal material, are sandwiched between the substrates and the respective electrode layers. The ultraviolet-cured product is made of an ultraviolet-curable fluorine-containing acrylate or epoxy series compound having the following formula.

17 Claims, 2 Drawing Sheets

V₉₀ : 90% OF SATURATED TRANSMISSION

POLYMER DISPERSED LIQUID CRYSTAL OPTICAL DEVICES

BACKGROUND OF THE INVENTION

1. Field of the Invention

This invention relates to a polymer dispersed liquid crystal optical device or liquid crystal film and in particular to a polymer dispersed liquid crystal optical device or liquid crystal film which is made functional by a light transmission and scattering mode and is used in display devices for displaying a character, picture, diagram, figure and etc. Light valves, light shutters, or the like, or switchable windows control transmission and cut-off of indecent light.

2. Description of the Related Art

Practical applications use conventional liquid crystal optical devices or liquid crystal films, TN type optical devices using nematic liquid crystal and STN type optical devices. In recent years, development on ferroelectric liquid crystal and antiferroelectric liquid crystal has been performed. However, these liquid crystals have heretofore required the use of a polarizer, thus there is a defect because these liquid crystals with a polarizer have restricted brightness and contrast.

In contrast thereto, WO 83/01016, the disclosure of which is hereby incorporated by reference herein. This disclosure teaches a method of encapsulating a liquid crystal material and dispersing such encapsulated liquid crystal material in a high molecular weight resin to give a polymer dispersed liquid crystal optical device. The optical device has a low attenuation of light because it does not require a polarizer. In this optical device, the encapsulated liquid crystal material alters a refractive index in the presence or absence of an electric field. Therefore, an encapsulating medium is selected so that it has a refractive index which is matched to that of the liquid crystal material under application of voltage. The resulting optical device becomes transparent when voltage is applied thereacross and becomes opaque due to light scattering when no voltage is applied thereacross. The polymer material for use in this prior art device includes polyvinyl alcohol, gelatin or the like.

Furthermore, optical devices which utilize a change in a refractive index of a liquid crystal material are known in which the liquid crystal material is dispersed in a two-pack system epoxy resin consisting of an uncured epoxy resin and a curing agent (WO 85/04262) and in an ultraviolet-curable resin (U.S. Pat. No. 4,728,547), the disclosures of which are hereby incorporated by reference herein.

In the above-mentioned polymer dispersed liquid crystal optical device in which the liquid crystal material is dispersed in the polymer material, a high driving voltage is required because of the strong interaction caused at an interface between the polymer material and the liquid crystal material.

SUMMARY OF THE INVENTION

Accordingly, an object of this invention is to provide a polymer dispersed liquid crystal optical device in which a photo-curable compound containing fluorine is used as a matrix resin of a liquid crystal material to reduce or weaken an interaction between the liquid crystal material and the matrix resin, thus reducing the driving voltage.

According to this invention, the above object is accomplished by providing a polymer dispersed liquid crystal optical device, comprising: two substrates each having an electrode layer, at least one of the substrates being transparent; and a photo-cured product and a liquid crystal material which are sandwiched between the substrates, the photo-cured product being made of a photo-curable compound selected from the group consisting of a fluorine-containing acrylate series compound having the following general formula [I]:

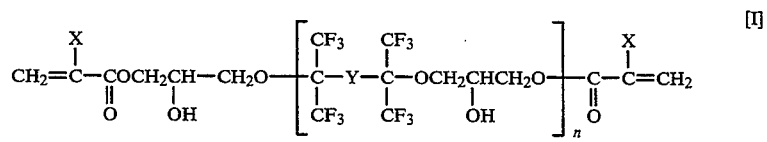

wherein X represents H or $CH_3$, n is any positive number, Y represents a

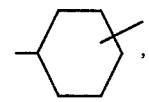

,

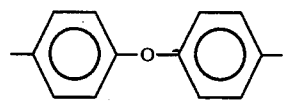

or

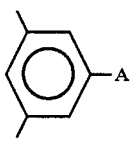

group and A represents H or a fluoro($C_1$-$C_{10}$)alkyl group, and a fluorine-containing epoxy series compound having the following general formula [II]:

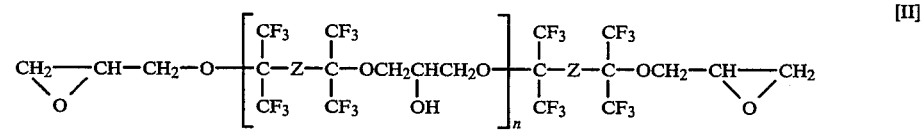

wherein Z represents a

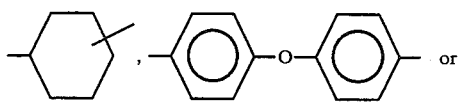 , 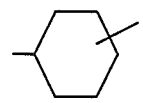 or

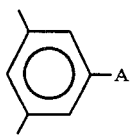

group, A represents H or a fluoro($C_1$–$C_{10}$)alkyl group and n is zero or any positive number.

In the above-mentioned general formula [I], it is preferred that X is H or $CH_3$, Y is

and n is 1,2 or 3, in the general formula [II], it is preferred that Z is

and n is 0, 1, 2 or 3.

Each of the substrates for use in this invention has an electrode layer with a high transparency, such as ITO (indium tin oxide) or the like, on the surface thereof. At least one of the substrates is transparent. The substrates are made of glass, plastics, metal or the like. The two substrates are disposed so that the electrodes are arranged on the side of a light valve layer. The spacing between the substrates can be arranged by using a spacer, such as is used in an ordinary liquid crystal device. Preferably the spacer is in the order of about 3-30 μm.

The liquid crystal material for use in this invention includes all of liquid crystal materials of nematic, smectic, cholesteric types. In addition, a dual frequency addressable liquid crystal can be used when the sign of Δε changes due to the applied frequency. Furthermore, some colors can be produced by using a host-guest type liquid crystal in which a dichroic dyestuff is incorporated. Various principles of this invention may be employed with various ones or combinations of the known types of liquid crystal material. It is preferred that the ratio of the liquid crystal material to be mixed is within the range of about 40-90 wt. % on weight of the composition.

The acrylic series compounds represented by the general formula [I] of this invention include, for instance, the compounds having the following formulae:

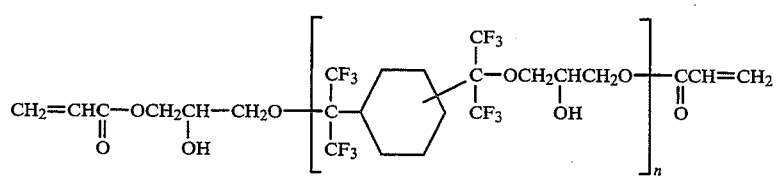

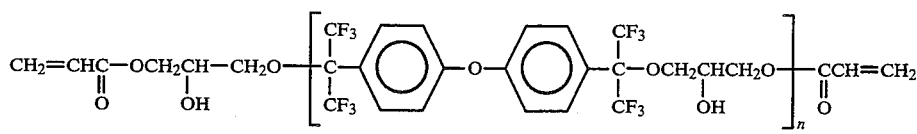

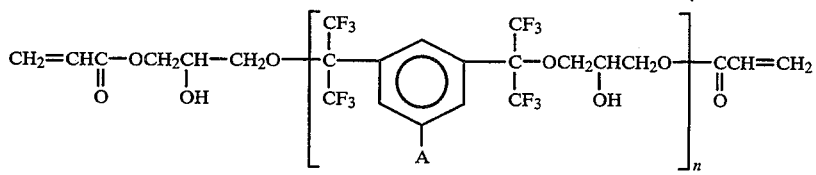

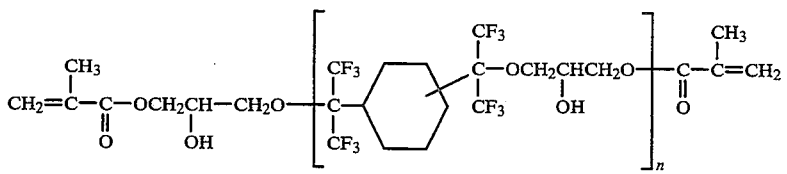

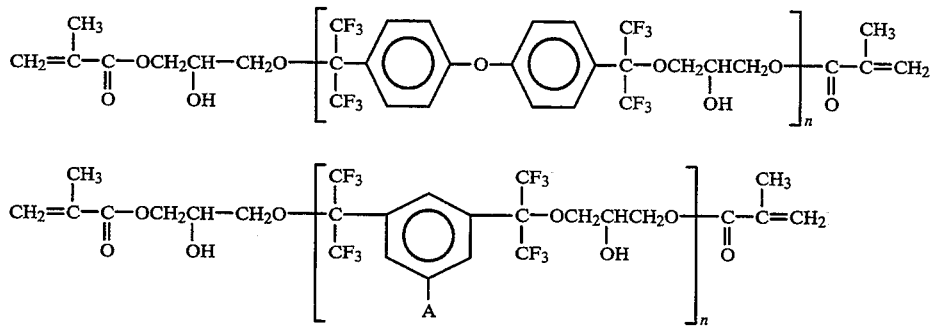

wherein A is as defined above and n is 1, 2 or 3.

Prepolymers, may be mixed with the acrylic series compounds of the general formula [I] in order to further enhance stability, uniformity or reliability in the optical device. These prepolymers are not particularly limited if they are compatible with the compounds represented by the formula [I]. The prepolymers include, for instance, 2-ethylhexyl acrylate, cyclohexyl acrylate, cyclopentanyl methacrylate, butylene glycol dimethacrylate, 2-hydroxypropyl acrylate, tricyclodexyl acrylate, tetrahydrofurfuryl acrylate, ethylene glycol diacrylate, styrene, both ends acryl-modified polybutadiene, butyl acrylate, 1,4-butanediol diacrylate, pentaerythritol triacrylate, trimethylolpropane triacrylate, urethane acrylate oligomer and the like. Of course, the prepolymers are not limited to the above-mentioned prepolymers. In addition, a coupling agent, such as gamma-mercaptopropyl trimethoxysilane or the like, may be added thereto according to the need.

It is ordinarily preferred that a photopolymerization initiator is added in order to promote a photo-curing reaction. The photopolymerization initiator can be conventional. The initiators include, for instance, acetophenones such as 2,2-diethoxy-acetophenone, 2-hydroxy-2-methyl-1-phenyl-1-on, 1-(4-isopropylphenyl)-2-hydroxy-2-methylpropane-1-on, 1-(4-dodecylphenyl)-2-hydroxy-2-methylpropane-1-on, 2-methyl-1-[4-(methylthio)phenyl]-2-morpholinopropane-1; benzoins such as benzoin methyl ether, benzoin ethyl ether, benzoin isopropyl ether, benzyldimethylketal and the like; benzophenones such as benzophenone, benzoylbenzoic acid, 4-phenyl benzophenone, 3,3-dimethyl-4-methoxybenzophenone and the like; thioxanthones such as thioxanthone, 2-chlorothioxanthone, 2-methylthioxanthone and the like.

The polymerization initiators may be in a solid or liquid form but it is preferred, from the standpoint of uniformity in the device, that these initiators are dissolved in or compatible with the photo-curable compounds. Concentration of the initiator is preferably about 30 wt. % or less, and more preferably about 1-5 wt. %, based on weight of the photo-curable compound, from the standpoint of the reliability of the device. A co-initiator, such as methyldiethanolamine, 4-dimethylaminobenzoic acid or the like, may be added thereto according to the need.

The epoxy series compounds represented by the general formula [II] of this invention include, for instance, the compounds having the following formula:

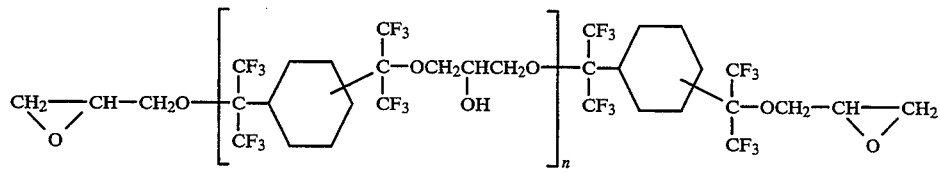

wherein n is 0, 1, 2 or 3.

Epoxy compounds, which may be combined with the epoxy series compounds of the general formula [II] in order to enhance stability, uniformity or reliability in the optical device, are particularly limited if the epoxy compound is compatible with the epoxy series. For instance, there can be used 2-ethylhexyl glycidyl ether, butanediol diglycidyl ether, pentaerythritol polyglycidyl ether, trimethylolpropane polyglycidyl ether, phenyl glycidyl ether, tetrafluoropropyl glycidyl ether, cyclohexane epoxide or the like. However, the epoxy compounds are not limited to the above-mentioned compounds.

It is ordinarily preferred that a photopolymerization initiator is added to promote photo-curing reaction. As for the photopolymerization initiator, there can be used diazonium salt, sulfonium salt, iodonium salt or selenium salt series initiators or the like, which are ordinarily used. Concentration of the initiator is preferably about 30 wt. % or less, more preferably about 1-5 wt. %, based on weight of the photo-curable compound, from the standpoint of the reliability of the device. A co-initiator, such as methyldiethanolamine, 4-dimethylaminobenzoic acid or the like, may be added thereto according to the need.

The polymer dispersed liquid crystal optical device according to this invention has different applications, for instance, light valves for controlling the transmission and cut-off of incident light, light shutter (e.g. constructional materials such as windows, partitions or the like) and display devices for displaying character, picture, diagram, figure and etc.

In the liquid crystal optical device according to this invention, the driving voltage is successfully reduced by using the fluorine-containing compound as the photo-curable compound such as an ultraviolet-curable compound or electron radiation curable compound.

The foregoing and other objects and features of this invention will be more apparent from the following description.

DETAILED DESCRIPTION OF THE PREFERRED EMBODIMENTS

This invention will be hereinafter described in more detail with a reference to the following non-limiting working Examples. The accompanying drawings and the effects practically achieved by this invention will also be discussed in detail in comparison with Comparative Example.

Figure 1:
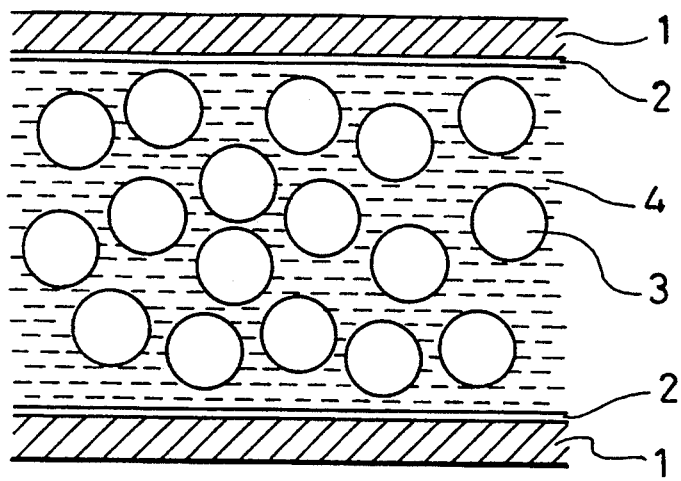
FIG. 1 is a partially and schematically cross-sectional view of a polymer dispersed liquid crystal optical device according to this invention.

FIG. 1 shows a partially and schematically cross-sectional view of a polymer dispersed liquid crystal optical device according to this invention. The optical device includes two substrates 1 each having an electrode layer 2 on the surface thereof, a photo-cured compound or product 4 as a matrix resin and droplets of a liquid crystal material 3 dispersed in the matrix resin. The photo-cured compound and the liquid crystal material are sandwiched between the substrates and each of the electrode layers. The optical device may be fabricated by sandwiching a photo-curable compound and the liquid crystal material, which is dispersed in the photo-curable compound, between the two substrates and then curing the photo-curable compound according to the conventional curing process.

EXAMPLE 1

A mixture solution of 24 wt. % of ultraviolet-curable resin UV3000 (trade name, manufactured by DAIKIN Industries, Ltd.) containing a fluorine-containing acryl compound having the following formula:

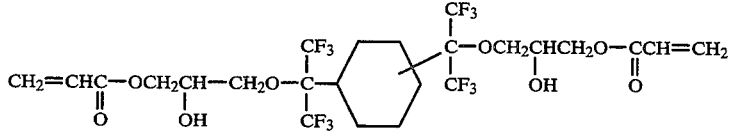

16 wt. % of 2-ethylhexyl acrylate and 60 wt. % of a positive dielectric anisotropic nematic liquid crystal RDP71120-1 (trade name, manufactured by RODIC Co., Ltd.) was injected into a liquid crystal cell having a gap of 10 μm. This liquid crystal cell was kept to 18° C. and irradiated with ultraviolet rays of 15 mW/cm² for 3 minutes to cure the ultraviolet-curable resin.

Figure 2:
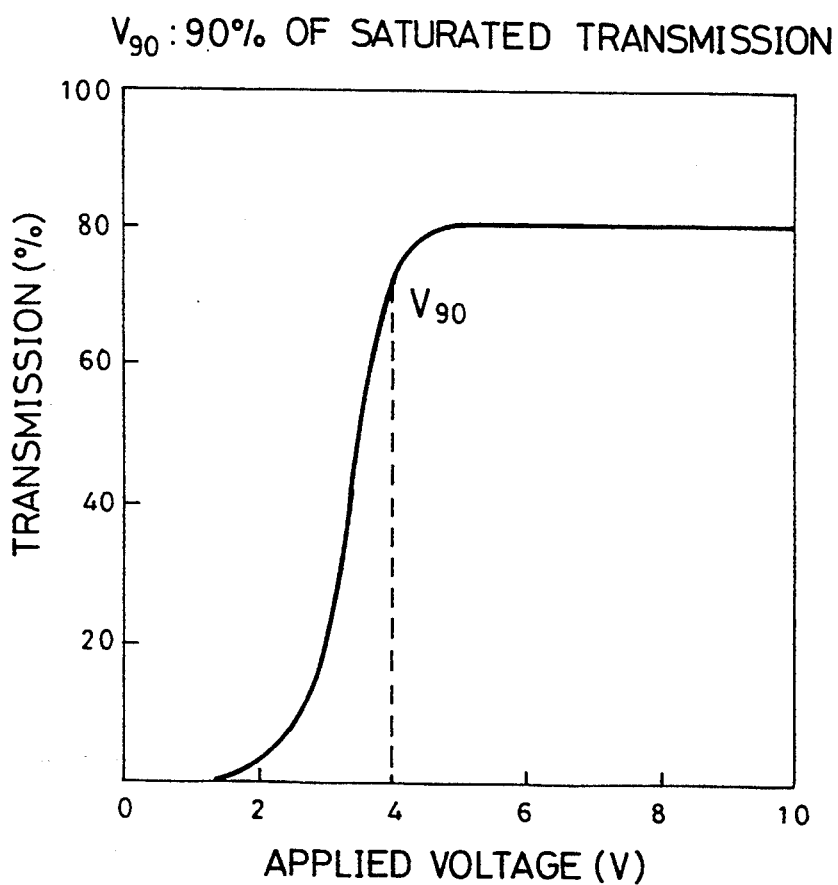
FIG. 2 is a graph showing the relation between transmission and applied voltage of a polymer dispersed liquid crystal optical device of Example 1 according to this invention.
Figure 3:
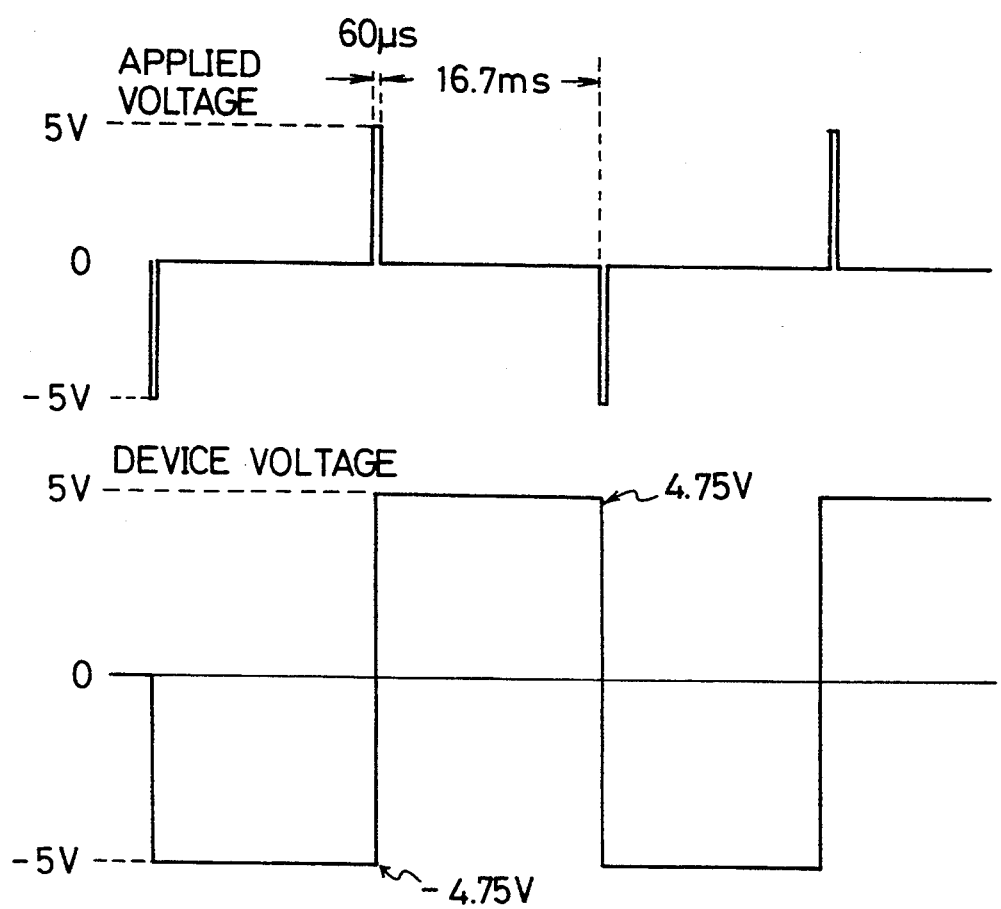
FIG. 3 is a graph showing the relation between a pulse voltage applied across the polymer dispersed liquid crystal optical device of Example 1 according to this invention and an electric charge holding ratio of the optical device.

The resulting polymer dispersed liquid crystal optical device was measured for its electro-optical properties as shown in FIGS. 2 and 3. FIG. 2 shows the relation between transmission (%) of the device and applied voltage (V) thereacross. FIG. 3 shows the relation between a pulse voltage applied across the device and the elapsed time, to determine an electric charge holding ratio thereof. As can be seen from FIG. 2, the driving voltage $V_{90}$ (90% of saturated transmission) at 25° C. was 4 V (light source: He—Ne laser, electric field: 100 Hz rectangular waves). The contrast of the device was 120 (F number: 15). Also, when voltage of 5 V (100 Hz) was applied across the device, response time to "on" was 15 ms and that to "off" was 20 ms (on and off are defined as the time needed, respectively, for the change of a transmission from 0% to 90%, and from 100% to 10% of its saturated transmission). In addition, the device had an electric charge holding ratio 95% as can be seen from FIG. 3.

After extracting the liquid crystal with ethanol, a polymer film was observed with SEM (scanning electron microscope) so that a size of the resulting liquid crystal droplets was in the range of about 1-2 μm.

EXAMPLE 2

A mixture solution of 24 wt. % of ultraviolet-curable resin UV3000 (trade name, manufactured by DAIKIN Industries Ltd.) containing a fluorine-containing acryl compound having the following formula:

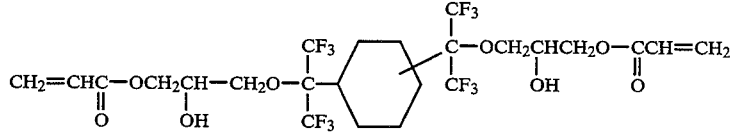

16 wt. % of 2-ethylhexyl acrylate and 60 wt. % of a positive dielectric anisotropic nematic liquid crystal E8 (trade name, manufactured by MERCK Co.) was injected into a liquid crystal cell having a gap of 10 μm. This liquid crystal cell was kept to 22° C. and irradiated with ultraviolet rays of 15 mW/cm² for 3 minutes to polymerize the ultraviolet-curable resin. The resulting polymer dispersed liquid crystal optical device was measured on electro-optical properties in the same manner as in Example 1. The driving voltage $V_{90}$ at 25° C. was 6 (100 Hz) and contrast was 110. Also, when the voltage of 6 V (100 Hz) was applied across the device, the response time to "on" was 10 ms and the response time to "off" was 15 ms. In addition, the device had an electric charge holding ratio of 65%.

After extracting the liquid crystal with ethanol, a polymer film was observed with SEM so that a size of the resulting liquid crystal droplets was in the range of about 1-2 μm.

EXAMPLE 3

The same procedures that were used in Example 1 are repeated except for using a fluorine-containing acryl compound having the following formula:

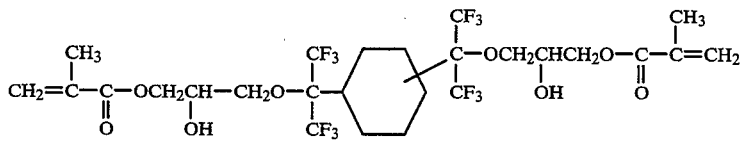

in place of the acryl compound as used in Example 1 to give a liquid crystal optical device. The resulting optical device has electro-optical properties similar to those as shown in the above-mentioned Examples.

Comparative Example 1

The same procedures that were used in Example 2 were repeated except for using a mixture solution of an urethane acryl oligomer M1200 (trade name, manufactured by TOAGOUSEI Chemical Industry Co., Ltd.) as a photo-curable compound and 2-ethylhexyl acrylate (a mixing ratio of 1:1 by weight), to give a liquid crystal optical device. The resulting optical device was measured for its electro-optical properties under the same conditions as in Example 2. The driving voltage $V_{90}$ at 25° C. was 15 V (100 Hz) and contrast was 100.

EXAMPLE 4

A mixture solution of 30 wt. % of ultraviolet-curable resin UV3100 (trade name, manufactured by DAIKIN Industries, Ltd.) containing a fluorine-containing epoxy compound having the following formula:

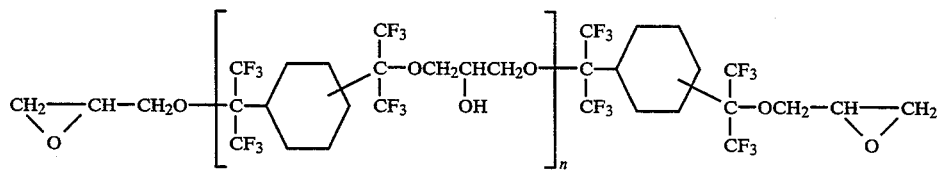

and 70 wt. % of a positive dielectric anisotropic nematic liquid crystal E8 (trade name, manufactured by MERCK Co.) was poured in a liquid crystal cell having a gap of 10 μm. This liquid crystal cell was kept to 45° C. and irradiated with ultraviolet rays of 100 mW/cm² for 10 minutes to polymerize the ultraviolet-curable resin. The resulting polymer dispersed liquid crystal optical device was measured for its electro-optical properties in the same manner as in Example 1. The driving voltage $V_{90}$ at 25° C. was 6 V (100 Hz) and contrast was 100. Also, when the voltage of 6 V (100 Hz) was applied across the device, the response time to "on" was 12 ms and the response time to "off" was 18 ms. In addition, the device had an electric charge holding ratio of 65%.

After extracting the liquid crystal with ethanol, a polymer film was observed with a SEM so that a size of the resulting liquid crystal droplets was in the range of about 0.5-1 μm.

As discussed above, this invention can provide the polymer dispersed liquid crystal optical device having a low driving voltage. In addition, the device is close to a TN type device because of the low driving voltage. Further it has the high electric charge holding ratio. Thus it is possible to perform active matrix driving due to a TFT type device using the ordinary liquid crystal driver.

While this invention has been described in connection with certain preferred embodiments, it is to be understood that the subject matter encompassed by this invention is not to be limited to those specific embodiments. On the contrary, it is intended for the subject matter of the invention to include all alternatives, modifications and equivalents as can be included within the spirit and scope of the following claims.

What is claimed is:

1. A polymer dispersed liquid crystal optical device, comprising:
   two substrates each having an electrode layer, at least one of said substrates being transparent; and
   a photo-cured product and a liquid crystal material which are sandwiched between said substrates, said photo-cured product being made of a photocurable fluorine-containing acrylate series compound having the following general formula [I]:

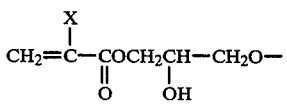

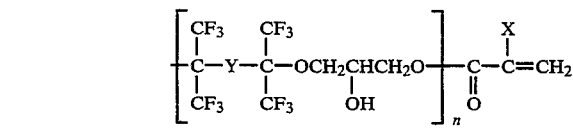

wherein X represents H or CH₃, n is any positive number, Y represents a

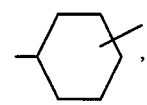

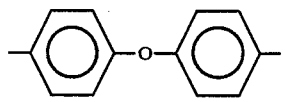

or

-continued

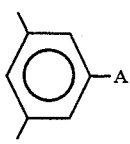

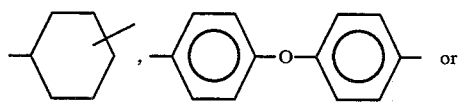    or

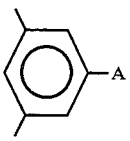

group and A represents H or a fluoro($C_1$–$C_{10}$)alkyl group.

2. The polymer dispersed liquid crystal optical device defined in claim 1, wherein said photo-curable compound is an ultraviolet-curable compound.

3. The polymer dispersed liquid crystal optical device defined in claim 1, wherein said X in the general formula [I] represents H.

4. The polymer dispersed liquid crystal optical device defined in claim 1, wherein said Y in the general formula [I] represents

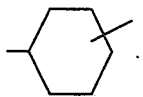

5. The polymer dispersed liquid crystal optical device defined in claim 1, wherein said n in the general formula [I] is 1.

6. The polymer dispersed liquid crystal optical device defined in claim 1, wherein said X in the general formula [I] represents H, said Y therein represents

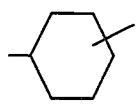

and n therein is 1.

7. The polymer dispersed liquid crystal optical device defined in claim 1, wherein said fluorine-containing acrylate series compound is mixed with at least one prepolymer selected from the group consisting of 2-ethylhexyl acrylate, cyclohexyl acrylate, cyclopentanyl methacrylate, butylene glycol dimethacrylate, 2-hydroxypropyl acrylate, tricyclodexyl acrylate, tetrahydrofurfuryl acrylate, ethylene glycol diacrylate, styrene, both ends acryl-modified polybutadiene, butyl acrylate, 1,4-butanediol diacrylate, pentaerythritol triacrylate, trimethylolpropane triacrylate and urethane acrylate oligomer.

8. The polymer dispersed liquid crystal optical device defined in claim 1, wherein said fluorine-containing acrylate series compound is mixed with 2-ethylhexyl acrylate.

9. A polymer dispersed liquid crystal optical device, comprising:
two substrates each having an electrode layer, at least one of said substrates being transparent; and
a photo-cured product and a liquid crystal material which are sandwiched between said substrates, said photo-cured product being made of a photo-curable fluorine-containing epoxy series compound having the following general formula [II]:

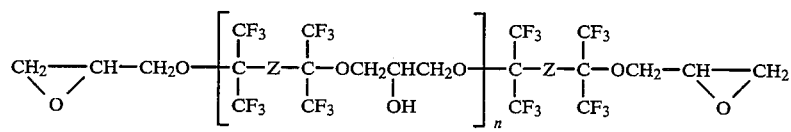 [II]

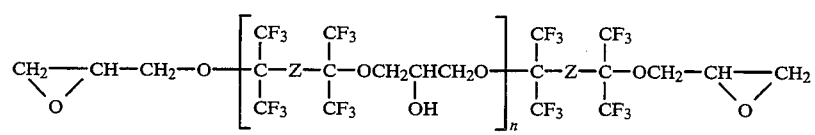 [II]

wherein Z represents

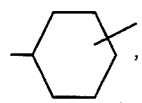

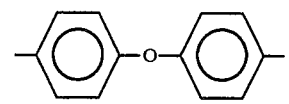

or

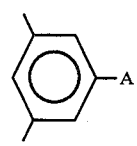

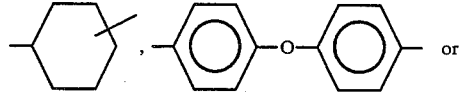    or

-continued

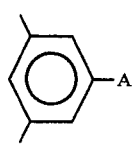

group, A represents H or a fluoro($C_1$–$C_{10}$)alkyl group and n is zero or any positive number.

10. The polymer dispersed liquid crystal optical device as defined in claim 9, wherein said photo-curable compound is an ultraviolet-curable compound.

11. The polymer dispersed liquid crystal optical device defined in claim 9, wherein said Z in the general formula [II] represents

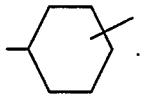

12. The polymer dispersed liquid crystal optical device defined in claim 9, wherein said n in the general formula [II] is 1.

13. The polymer dispersed liquid crystal optical device defined in claim 9, wherein said fluorine-containing epoxy series compound is mixed with at least one compound selected from the group consisting of 2-ethylhexyl glycidyl ether, butanediol diglycidyl ether, pentaerythritol polyglycidyl ether, trimethylolpropane polyglycidyl ether, phenyl glycidyl ether, tetrafluoropropyl glycidyl ether and cyclohexene epoxide.

14. A polymer dispersed liquid crystal optical device, comprising:

two substrates each having an electrode layer, at least one of said substrates being transparent; and an ultraviolet-cured product and a neumatic liquid crystal material which are sandwiched between said substrates, said ultraviolet-cured product being made of an ultraviolet-curable compound selected from the group consisting of a fluorine-containing acrylate series compound having the following formula:

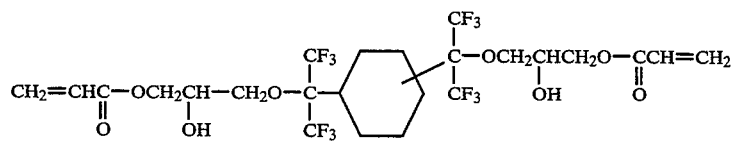

and a fluorine-containing epoxy series compound having the following formula

15. The polymer dispersed liquid crystal optical device defined in claim 14, wherein said fluorine-containing acrylate series compound is mixed with at least one prepolymer selected from the group consisting of 2-ethylhexyl acrylate, cyclohexyl acrylate, cyclopentanyl methacrylate, butylene glycol dimethacrylate, 2-hydroxypropyl acrylate, tricyclodexyl acrylate, tetrahydrofurfuryl acrylate, ethylene glycol diacrylate, styrene, both ends acryl-modified polybutadiene, butyl acrylate, 1,4-butanediol diacrylate, pentaerythritol triacrylate, trimethylolpropane triacrylate and urethane acrylate oligomer.

16. The polymer dispersed liquid crystal optical device defined in claim 14, wherein said fluorine-containing acrylate series compound is mixed with 2-ethylhexyl acrylate.

17. The polymer dispersed liquid crystal optical device defined in claim 14, wherein said fluorine-containing epoxy series compound is mixed with at least one compound selected from the group consisting of 2-ethylhexyl glycidyl ether, butanediol diglycidyl ether, pentaerythritol polyglycidyl ether, trimethylolpropane polyglycidyl ether, phenyl glycidyl ether, tetrafluoropropyl glycidyl ether and cyclohexene epoxide.

* * * * *